(12) United States Patent
Clemm et al.

(10) Patent No.: US 10,659,497 B2
(45) Date of Patent: May 19, 2020

(54) ORIGINATOR-BASED NETWORK RESTRAINT SYSTEM FOR IDENTITY-ORIENTED NETWORKS

(71) Applicant: Futurewei Technologies, Inc., Plano, TX (US)

(72) Inventors: Alexander Clemm, Los Gatos, CA (US); Uma S. Chunduri, Fremont, CA (US); Padmadevi Pillay-Esnault, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 186 days.

(21) Appl. No.: 15/639,976

(22) Filed: Jun. 30, 2017

(65) Prior Publication Data
US 2018/0337950 A1 Nov. 22, 2018

Related U.S. Application Data (60) Provisional application No. 62/508,217, filed on May 18, 2017.

(51) Int. Cl.
*H04L 29/06* (2006.01)
*H04L 12/24* (2006.01)
*H04L 29/12* (2006.01)

(52) U.S. Cl.
CPC .......... *H04L 63/20* (2013.01); *H04L 41/0893* (2013.01); *H04L 61/103* (2013.01);
(Continued)

(58) Field of Classification Search
CPC ..... H04L 63/20; H04L 63/10; H04L 41/0893; H04L 61/2007; H04L 61/2084; H04L 61/103; H04L 63/101
See application file for complete search history.

(56) References Cited

U.S. PATENT DOCUMENTS

| | | | | |
|---|---|---|---|---|
| 8,966,075 | B1 * | 2/2015 | Chickering | ......... H04L 12/4641 709/220 |
| 2011/0116636 | A1 * | 5/2011 | Steed | ...................... G06F 21/10 380/281 |
| 2018/0227301 | A1 * | 8/2018 | Maruyama | .............. H04L 63/08 |

OTHER PUBLICATIONS

Pillay-Esnault, P., et al., "Requirements for Generic Identity Services in Identity Enabled Networks", Network Working Group, (Jul. 3, 2017), 17 pgs.

(Continued)

*Primary Examiner* — Ayoub Alata
(74) *Attorney, Agent, or Firm* — Schwegman Lundberg & Woessner, P.A.

(57) ABSTRACT

A computer-implemented method of extending generic resilient identity services (GRIDS) is provided that comprises: receiving, by a mapping server, a resolve request from an originator endpoint for a locator of a destination endpoint; sending, by the mapping server, a request for authorization to provide the requested locator, the request for authorization indicating an identifier of the originator endpoint; receiving, by a policy server, the request for authorization; accessing, by the policy server, from a database, a set of policies for the destination endpoint; based on the identifier of the originator endpoint and the set of policies for the destination endpoint, sending, by the policy server, an authorization response to the mapping server; and based on the authorization response, sending, by the mapping server, a response to the resolve request to the originator endpoint.

20 Claims, 9 Drawing Sheets

(52) U.S. Cl.
CPC ...... *H04L 61/2007* (2013.01); *H04L 61/2084* (2013.01); *H04L 63/10* (2013.01); *H04L 63/101* (2013.01)

(56) References Cited

OTHER PUBLICATIONS

Pillay-Esnault, P., et al., "Use Cases for Identity Enabled Networks", Network Working Group, (Jul. 3, 2017), 17 pgs.

\* cited by examiner

| IDENTITY TABLE | | 610 |
|---|---|---|
| IDENTITY | IDENTIFIER | |
| ABCDEFG | AB123 | |
| ABCDEFG | ABXYZ | |
| ABCDEFG | ZABCDEF | |
| Z123ABC | CD321 | |
| Z123ABC | MFSOP | |

600 — 605, 615, 620, 625, 630, 635

| POLICY TABLE | | | 665 |
|---|---|---|---|
| DESTINATION IDENTITY | SOURCE IDENTITY | ACTION | |
| ABCDEFG | * | BLOCK | |
| ABCDEFG | C3POR2D2 | ALLOW | |
| ABCDEFG | Z123ABC | ALLOW | |
| Z123ABC | * | ALLOW | |
| Z123ABC | ABCDEFG | BLOCK | |

ORIGINATOR-BASED NETWORK RESTRAINT SYSTEM FOR IDENTITY-ORIENTED NETWORKS

PRIORITY CLAIM

The application claims priority to U.S. Provisional Patent Application No. 62/508,217, filed May 18, 2017, entitled "Originator-Based Network Restraint System for Identity-Oriented Networks," which is incorporated herein by reference in its entirety.

TECHNICAL FIELD

The present disclosure is related to identity-oriented networks (IONs), and particularly to an originator-based network restraint system for IONs.

BACKGROUND

Internet Protocol (IP) addresses have an overloaded semantic where an address represents both an identifier (ID) for an entity and its location. ID-Oriented Networking (ION) replaces IP addresses, or any other locators, with Identifiers. Identifiers are long-lived, and are tied to communication endpoint identity, not location. Locator information is resolved as needed—by endpoints or by gateways. ION requires a service generic resilient identity services (GRIDS)—mapping service (GRIDS-MS) that maintains and resolves mappings between identifiers and locators. In all networks, filtering of unwanted communications (e.g. spam filters, black lists) is generally performed near the destination.

GRIDS may be deployed on one or more computers providing network control infrastructure (e.g., local servers, remote servers, or networking nodes).

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer-implemented method of extending generic resilient identity services (GRIDS) is provided that comprises: receiving, by one or more processors of a mapping server, a resolve request from an originator endpoint for a locator of a destination endpoint; sending, by the one or more processors of the mapping server, a request for authorization to provide the requested locator, the request for authorization indicating an identifier of the originator endpoint; receiving, by one or more processors of a policy server, the request for authorization; accessing, by the one or more processors of the policy server, from a database, a set of policies for the destination endpoint; based on the identifier of the originator endpoint and the set of policies for the destination endpoint, sending, by the one or more processors of the policy server, an authorization response to the mapping server; and based on the authorization response, sending, by the one or more processors of the mapping server, a response to the resolve request to the originator endpoint.

Optionally, in any of the preceding aspects, the authorization response sent by the policy server denies authorization and the response to the resolve request sent by the mapping server excludes the locator of the destination endpoint.

Optionally, in any of the preceding aspects, the response to the resolve request includes a null locator in place of the locator of the destination endpoint.

Optionally, in any of the preceding aspects, the response to the resolve request includes an indication that the response to the resolve request excludes the locator of the destination endpoint.

Optionally, in any of the preceding aspects, the response to the resolve request that excludes the locator of the destination endpoint includes a locator of a security system in place of the locator of the destination endpoint.

Optionally, in any of the preceding aspects, the method further comprises: receiving, at the security system, data packets from the originator endpoint, the data packets indicating the locator of the security system and an identifier of the destination endpoint.

Optionally, in any of the preceding aspects, the resolve request for the locator of the destination endpoint is a second resolve request for a second locator of the destination endpoint; the request for authorization to provide the second locator is a second request for authorization; the authorization response is a second authorization response; the response to the resolve request is a second response to the second resolve request; and the method further comprises, prior to the receipt of the second resolve request: receiving, by the one or more processors of the mapping server, a first resolve request from an originator endpoint for a first locator of a destination endpoint; sending, by the one or more processors of the mapping server, a first request for authorization to provide the first locator, the first request for authorization indicating the identifier of the originator endpoint; receiving, by the one or more processors of the policy server, the first request for authorization; based on the identifier of the originator endpoint and the set of policies for the destination endpoint, sending, by the one or more processors of the policy server, a first authorization response that grants authorization; based on the first authorization response, sending, by the one or more processors of the mapping server, a first response to the first resolve request to the originator endpoint, the first response to the first resolve request including the first locator of the destination endpoint; receiving, by the one or more processors of the policy server, a policy for the destination endpoint; and updating the set of policies for the destination endpoint based on the received policy.

Optionally, in any of the preceding aspects, the response to the resolve request includes the locator of the destination endpoint.

Optionally, in any of the preceding aspects, each policy of the set of policies indicates a set of criteria for preventing entities from receiving a locator for the destination endpoint.

According to one aspect of the present disclosure, a system comprises: a mapping server comprising: a first memory storage comprising first instructions; and one or more first processors in communication with the first memory storage, wherein the one or more first processors execute the first instructions to perform: receiving a resolve request from an originator endpoint for a locator of a destination endpoint; and sending a request for authorization to provide the requested locator, the request for authorization indicating an identifier of the originator endpoint; and a policy server comprising: a second memory storage comprising second instructions; and one or more second processors in communication with the second memory storage, wherein the one or more second processors execute the second instructions to perform: receiving, by one or more processors of a policy server, the request for authorization; accessing, by the one or more processors of the policy server, from a database, a set of policies for the destination endpoint; and based on the identifier of the originator endpoint and the set of policies for the destination endpoint, sending, by the one or more processors of the policy server, an authorization response to the mapping server; wherein the one or more first processors of the mapping server are further configured to perform: based on the authorization response, sending a response to the resolve request to the originator endpoint.

Optionally, in any of the preceding aspects, the authorization response denies authorization and the response to the resolve request excludes the locator of the destination endpoint.

Optionally, in any of the preceding aspects, the response to the resolve request includes a null locator in place of the locator of the destination endpoint.

Optionally, in any of the preceding aspects, the response to the resolve request includes an indication that the response to the resolve request excludes the locator of the destination endpoint.

Optionally, in any of the preceding aspects, the response to the resolve request includes a locator of a security system in place of the locator of the destination endpoint.

Optionally, in any of the preceding aspects, the system further comprises: a security system comprising: a third memory storage comprising third instructions; and one or more third processors in communication with the third memory storage, wherein the one or more third processors execute the third instructions to perform: receiving data packets from the originator endpoint, the data packets indicating the locator of the security system and an identifier of the destination endpoint.

Optionally, in any of the preceding aspects, the resolve request for the locator of the destination endpoint is a second resolve request for a second locator of the destination endpoint; the request for authorization to provide the second locator is a second request for authorization; the authorization response is a second authorization response; the response to the resolve request is a second response to the second resolve request; the one or more first processors of the mapping server are further configured to perform: receiving, prior to the receipt of the second resolve request, a first resolve request from the originator endpoint for a first locator of the destination endpoint; and sending a first request for authorization to provide the first locator, the first request for authorization indicating the identifier of the originator endpoint; the one or more second processors of the policy server are further configured to perform: receiving the first request for authorization; and based on the identifier of the originator endpoint and the set of policies for the destination endpoint, sending a first authorization response that grants authorization; the one or more first processors of the mapping server are further configured to perform: based on the first authorization response, sending a first response to the first resolve request to the originator endpoint, the first response to the first resolve request including the first locator of the destination endpoint; and the one or more second processors of the policy server are further configured to perform: receiving a policy for the destination endpoint; and updating the set of policies for the destination endpoint based on the received policy.

Optionally, in any of the preceding aspects, the response to the resolve request includes the locator of the destination endpoint.

According to one aspect of the present disclosure, a non-transitory computer-readable medium is provided that stores computer instructions wherein, the instructions, when executed by one or more processors of a mapping server and a policy server, cause the one or more processors to perform steps of: receiving, by the mapping server, a resolve request from an originator endpoint for a locator of a destination endpoint; sending, by the mapping server, a request for authorization to provide the requested locator, the request for authorization indicating an identifier of the originator endpoint; receiving, by the policy server, the request for authorization; accessing, by the policy server, from a database, a set of policies for the destination endpoint; based on the identifier of the originator endpoint and the set of policies for the destination endpoint, sending, by the policy server, an authorization response to the mapping server; and based on the authorization response, sending, by the mapping server, a response to the resolve request to the originator endpoint.

Optionally, in any of the preceding aspects, the authorization response sent by the policy server denies authorization and the response to the resolve request sent by the mapping server excludes the locator of the destination endpoint.

Optionally, in any of the preceding aspects, the response to the resolve request includes a null locator in place of the locator of the destination endpoint.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

Some terminology used herein:

Entity: A communications endpoint that has a unique primary identifier (P-ID). The entity may also have other identifiers that are mapped to the P-ID.

GRIDS-AP: GRIDS Access Point, a point through which a client interacts with GRIDS.

GRIDS-MS: GRIDS Mapping Server, a server providing a mapping service used to maintain and resolve mappings between identifiers and locators. To resolve a mapping between an identifier and a locator is to provide the locator corresponding to a given identifier.

GRIDS-PS: GRIDS Policy Server, a server providing a policy service used to maintain and resolve communications policies (including communications authorization policies). In some example embodiments, the policy service and the mapping service are provided by the same server, which is thus both a GRIDS-MS and a GRIDS-PS. In other example embodiments, the GRIDS-PS and the GRIDS-MS are separate servers.

A GRIDS-PS maintains policies regarding permissions of which entities may communicate with or send packets to other entities. To communicate via the GRIDS network, each GRIDS client (as identified by source ID) needs to authenticate with a GRIDS-AP and is hence known to GRIDS. To communicate with a destination client, an originating client makes a mapping resolution request to the GRIDS-MS, requesting a locator for an ID of the destination client. The mapping resolution request includes the ID of the originating client. When a client makes a mapping resolution request to resolve an ID's locator, GRIDS-MS checks with GRIDS-PS to determine whether the originating client's ID is permitted to send packets to requested destination ID. Permissions are based on communications policies. The policies may be configured by endpoints to specify who they are willing to receive traffic from. In some example embodiments, policies are specified at the network level in addition to or instead of being specified by the endpoints.

In the event that a policy prohibits revealing the destination ID's locator to the originating client, GRIDS-MS may respond with an error to the originating client. Alternatively, GRIDS-MS may respond with a locator that redirects packets to a security server where traffic can be scrubbed, or a locator corresponding to a "null" destination. Packets addressed to the "null" destination may be discarded by the network. When a locator other than the locator of the destination ID is provided to the originating client, the fact that the true locator is denied to the client may not be revealed.

When requesting a locator for a destination client, the originating client may also subscribe to the destination client. In this way, the originating client is informed by the GRIDS-MS when the locator of the destination client changes. In some example embodiments, policy verification is performed before mapping updates are sent in case of subscriptions, in order to capture any changes in policy made after initial requests were resolved.

In some example embodiments, use of the GRIDS-PS will not prevent unwanted communications in cases where the sender already has an ID's locator and does not require interaction with GRIDS. In those example embodiments, the GRIDS-PS provides a novel defense perimeter of a multi-layered defense but may not be sufficient as the only layer of defense.

In contrast to existing solutions that block traffic at or near the destination (e.g., firewalls and spam filters), one or more example embodiments disclosed herein block traffic by preventing it from entering the network by denying locator information. Additionally, policies may be enforced on the basis of sender identity, client identity, or a combination thereof, and not just on the basis of matching an identifier.

Figure 1:
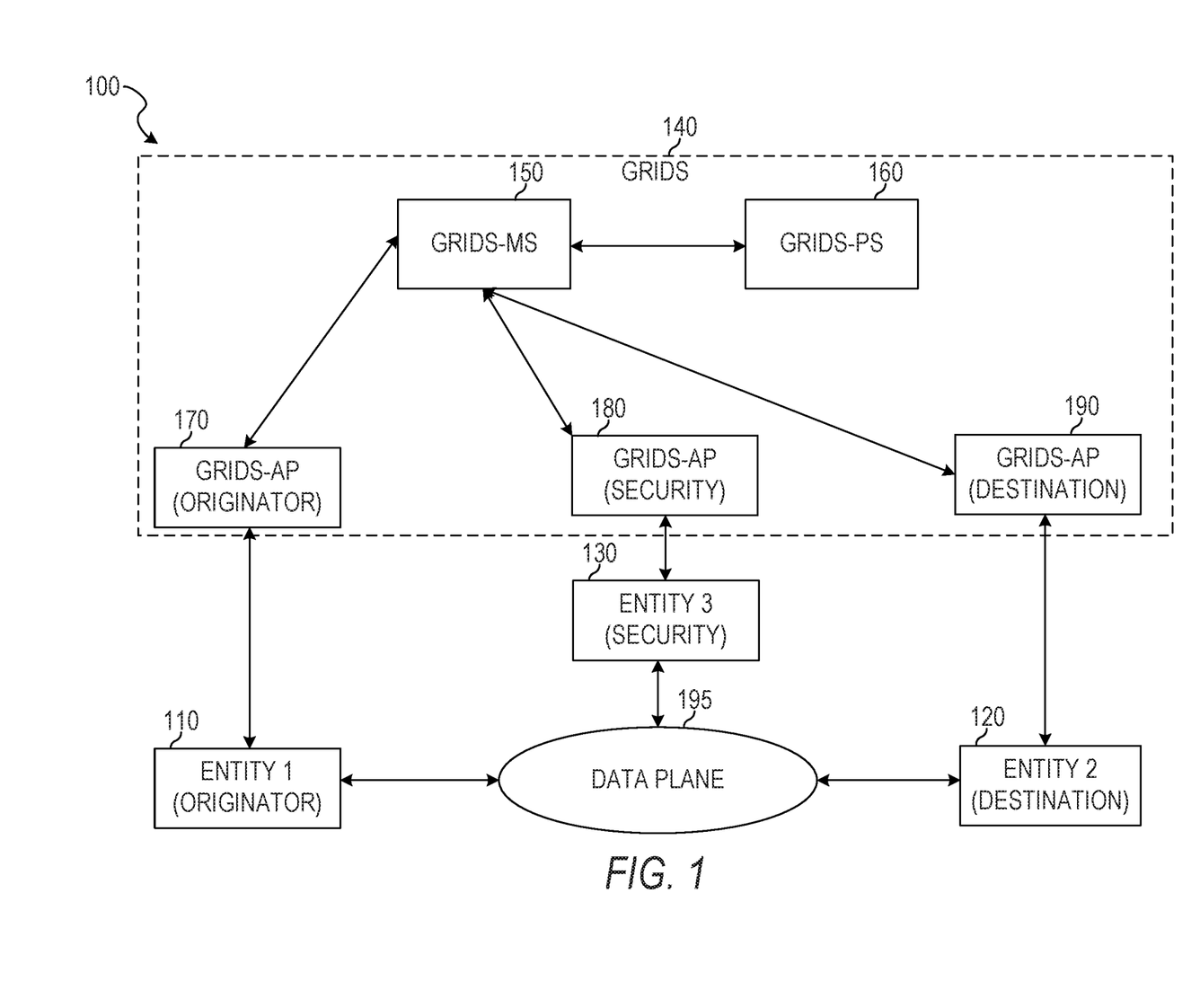
FIG. 1 is an illustration of an example network organization for implementing an originator-based network restraint system for IONs, according to some example embodiments.

FIG. 1 is an illustration of an example network organization 100 for implementing an originator-based network restraint system for IONs, according to some example embodiments. The example network organization 100 includes a first endpoint 110, a second endpoint 120, a security endpoint 130, a data plane 195, and a GRIDS network 140. The GRIDS network 140 comprises a GRIDS access point (AP) 170, a GRIDS-AP 180, a GRIDS-AP 190, a GRIDS-MS 150, and a GRIDS-PS 160. The first endpoint 110, the second endpoint 120, the security endpoint 130, the GRIDS-AP 170, the GRIDS-AP 180, the GRIDS-AP 190, the GRIDS-MS 150, and the GRIDS-PS 160 may each be implemented using one or more computing devices 500, described below with respect to FIG. 5. Additionally or alternatively, the GRIDS-MS 150 and the GRIDS-PS 160 may be implemented in one or more virtual machines (VMs), using distributed computing, or any suitable combination thereof.

The endpoint 110 may register with the originating GRIDS-AP 170, allowing the endpoint 110 to communicate via the GRIDS network 140. Similarly, the endpoint 120 may register with the destination GRIDS-AP 190 and the security endpoint 130 may register with the security GRIDS-AP 180. To communicate with the endpoint 120, the endpoint 110 may request a locator for an identifier of the endpoint 120 from the originating GRIDS-AP 170. The GRIDS-AP 170 forwards the request to the GRIDS-MS 150, which may include a database mapping identifiers to locators. Instead of immediately responding to the request with the locator for the identifier, the GRIDS-MS 150 sends the identifier for both entities to the GRIDS-PS 160. The GRIDS-PS 160 stores the policies (e.g., whitelists, black-lists, content filters, or any suitable combination thereof) for one or more endpoints, including the endpoint 120.

For example, a policy may block all traffic to the destination endpoint from a particular entity, block all traffic to the destination endpoint from a particular type of entity (e.g., smart light bulbs, automatic teller machines, or political parties), or any suitable combination thereof. In some example embodiments, the database includes policies for a large number of destination endpoints (e.g., 1,000 endpoints or 1,000,000 endpoints).

The GRIDS-PS 160 sends a response to the GRIDS-MS 150 indicating whether or not to send the location of the endpoint 120 to the endpoint 110. Depending on the response from the GRIDS-PS 160, the GRIDS-MS 150 may send the locator for the endpoint 120 to the originating GRIDS-AP 170, another locator (e.g., a locator of the security endpoint 130), or a negative response. The originating GRIDS-AP 170 sends the received data to the endpoint 110, which then communicates with the endpoint 120 or another endpoint using the received locator (if any) via the data plane 195.

Figure 2:
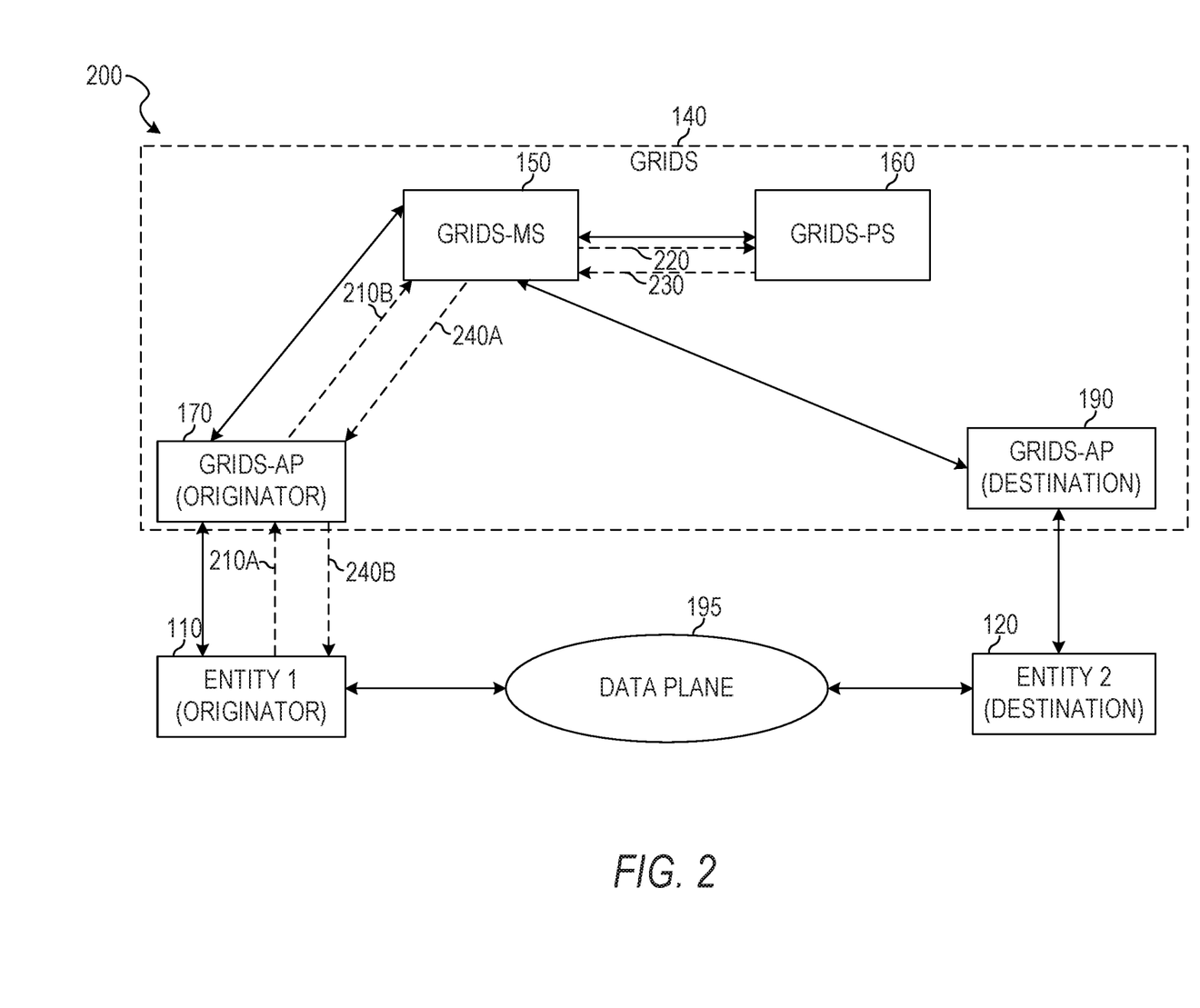
FIG. 2 is an illustration of an example communication flow within the example network organization for implementing an originator-based network restraint system for IONs, according to some example embodiments.

FIG. 2 is an illustration of an example communication flow 200 within the example network organization 100 for implementing an originator-based network restraint system for IONs, according to some example embodiments. The communication flow 200 includes the communications 210A, 210B, 220, 230, 240A, and 240B.

In the communication 210 (composed of the communications 210A and 210B), the endpoint 110 sends a resolve-loc request to the GRIDS-MS 150 via the GRIDS-AP 140. The resolve-loc request includes the identifier of the destination (e.g., the endpoint 120) and an authentication token for the endpoint 110 (previously received from the GRIDS-AP 140).

In the communication 220, responsive to receipt of the resolve-loc request, the GRIDS-MS 150 sends a check-authorization request to the GRIDS-PS 160. The check-authorization request includes the identifiers for both the source and the destination (e.g., the endpoints 110 and 120).

In the communication 230, responsive to the check-authorization request, the GRIDS-PS 160 sends an authorization-response to the GRIDS-MS 150, indicating whether communication is permitted or denied.

In the communication 240 (composed of the communications 240A and 240B), after receiving the authorization-response and responsive to the resolve-loc request, the GRIDS-MS 150 sends a resolve-result message to the endpoint 110 via the originating GRIDS-AP 140. The resolve-result message indicates the destination location (e.g., the location of the endpoint 120), indicates that the request was denied, or indicates an alternate location to which the endpoint 110 may send communications without being notified that the alternate location is not actually the location of the endpoint 120.

If the destination location is provided, the endpoint 110 is enabled to communicate with the endpoint 120 through the data plane 180 by sending data packets to the destination location.

Figure 3:
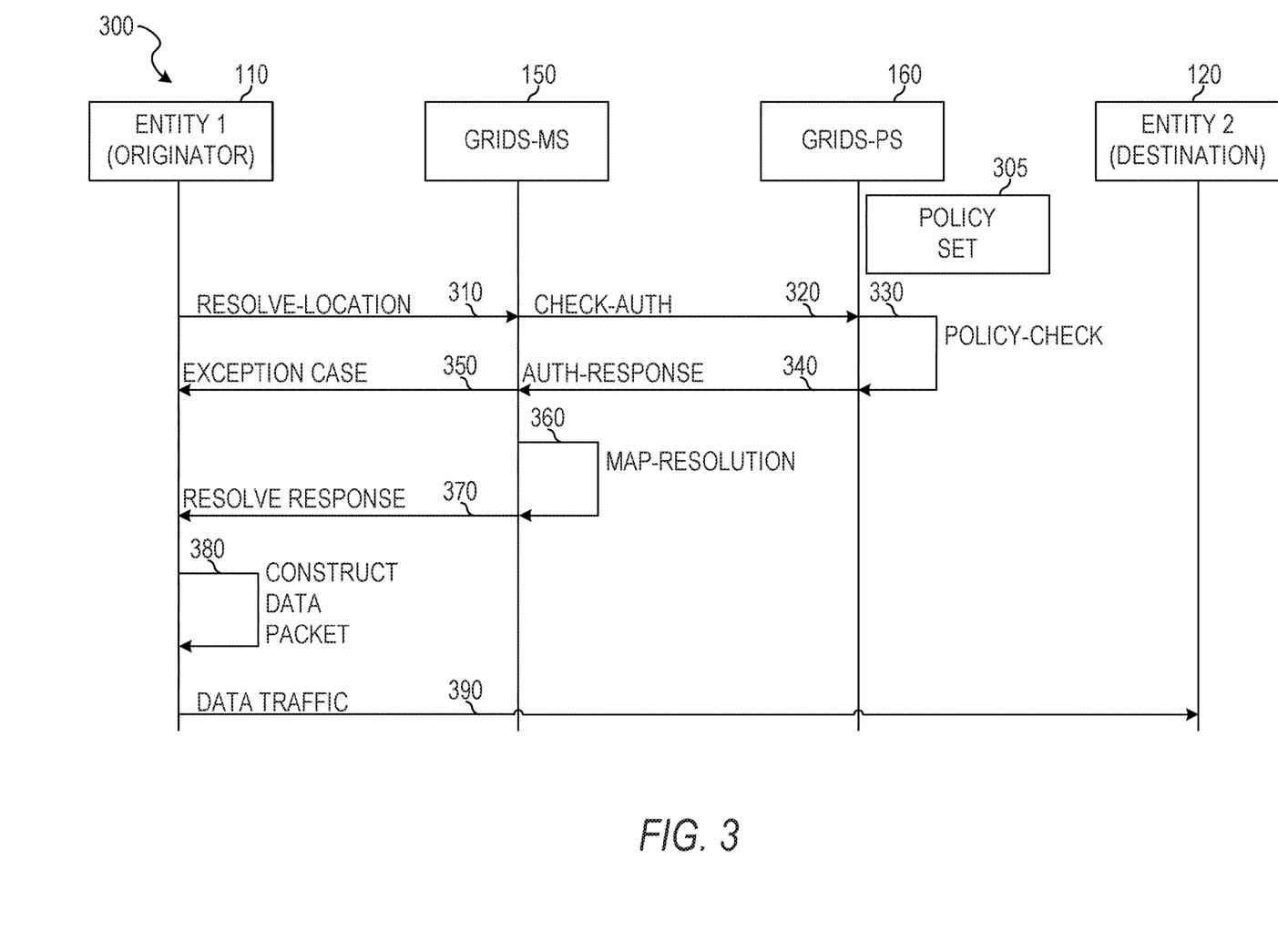
FIG. 3 is an illustration of an example communication flow within the example network organization for implementing an originator-based network restraint system for IONs, according to some example embodiments.

FIG. 3 is an illustration of an example communication flow 300 within the example network organization 100 for implementing an originator-based network restraint system for IONs, according to some example embodiments. The sequence of communication begins at the upper-left of the figure and follows the sequence of arrows. The example communication flow 300 comprises communications 310, 320, 340, 350, 370, and 390. Operations 305, 330, 360, and 380 are also shown.

In operation 305, the GRIDS-PS 160 sets one or more policies for the destination endpoint 120. For example, the destination endpoint 120 may send one or more policies to the GRIDS-AP 170 during registration via a secure channel. The GRIDS-AP 170 may forward the policies to the GRIDS-PS 160. Each policy may indicate a source identifier, a destination identifier, a source identity, a destination identity, an action, or any suitable combination thereof. For example, with reference to the database schema of FIG. 6, a policy to block a particular source for a destination may include the identity of the destination, an identifier for the source, and a "block" action. The GRIDS-PS 160 may determine the identity for the source from the identifier for the source using the identity table 600 and create a new row in the policy table 650 that includes the destination identity, the source identity, and the action.

In the communication 310, the originator (e.g., the endpoint 110) sends a resolve-loc request to the GRIDS-MS 150. The resolve-loc request includes the identifier of the destination and an authentication token for the originator.

Responsive to receipt of the resolve-loc request, the GRIDS-MS 150 sends a check-authorization request (communication 320) to the GRIDS-PS 160. The check-authorization request includes the identifiers for both the source and the destination.

The GRIDS-PS 160 performs a policy check (operation 330) by resolving the identity of the received destination identifier and checking the policies for that identity. The GRIDS-PS 160 may resolve the identity, type, metadata, or any suitable combination thereof for the source identifier and match the resolved information against the policies for the destination.

Example policies include denying a particular originator for a particular destination (e.g., a recipient choosing to block a particular sender), denying a particular originator for a set of destinations (e.g., an internet service provider (ISP) choosing to block a particular sender for all of the ISP's users), allowing one or more listed originators for a destination and preventing all other originators from accessing a locator for the destination, allowing one or more listed destinations for an originator and preventing the originator from accessing locators for all other destinations, or any suitable combination thereof.

After performing the policy check and responsive to the check-authorization request, the GRIDS-PS 160 sends an authorization-response (communication 340) to the GRIDS-MS 150, indicating whether communication is permitted or denied.

If communication is denied, the GRIDS-MS 150 sends communication 350, either denying access to the location of the destination entity (e.g., the endpoint 120) or sending a locator of a security system. If communication is permitted, the GRIDS-MS 150 looks up the locator of the destination (operation 360) and sends the locator to the originator in a resolve-response message (communication 370).

In operation 380, the originator (e.g., the endpoint 110) constructs one or more data packets using the destination locator (or the security system locator provided in its place without the originator's knowledge of the substitution). The data packets are sent from the originator to the destination (or security system) in communication 390.

Figure 4:
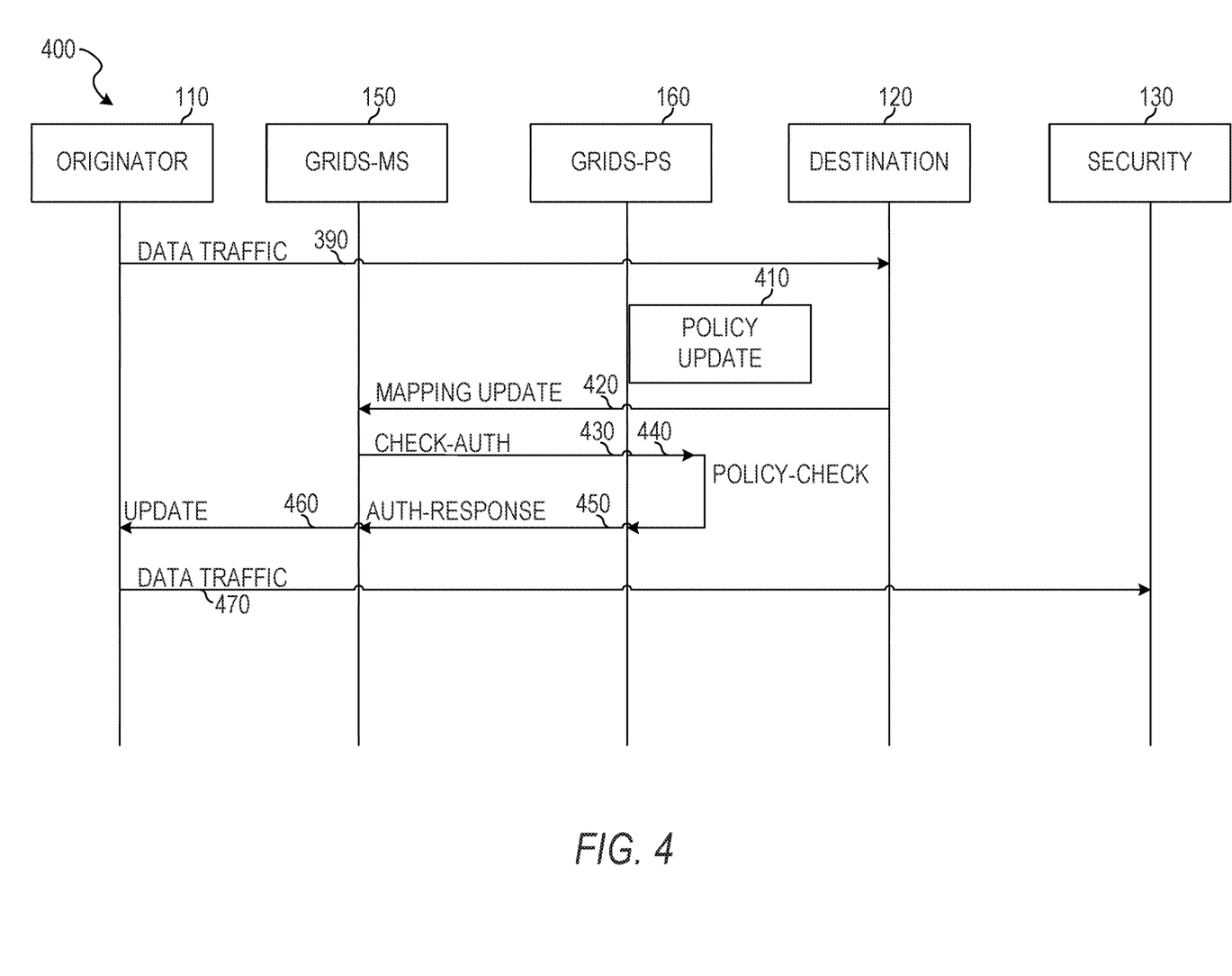
FIG. 4 is an illustration of an example communication flow within the example network organization for implementing an originator-based network restraint system for IONs, according to some example embodiments.

FIG. 4 is an illustration of an example communication flow 400 within the example network organization 100 for implementing an originator-based network restraint system for IONs, according to some example embodiments. The communication flow 400 of FIG. 4 may be used when a policy for a destination is changed after communication between the originator and the destination has already begun. The communication flow 400 may be used after data traffic communication 390 has begun through use of the communication flow 300. The communication flow 400 includes communications 420, 430, 450, 460, and 470. Also shown in FIG. 4 are operations 410 and 440.

After the data connection 390 is established between the originator and the destination, a policy update occurs at the GRIDS-PS 160 (operation 410). For example, the destination may send an updated policy to the GRIDS-PS 160 or an administrator may update the policy.

After the policy is updated, the destination (e.g., the endpoint 120) sends a mapping update communication 420 to the GRIDS-MS 150. For example, if the destination is a mobile device, the mobile device may have physically moved such that the prior GRIDS-AP (e.g., the GRIDS-AP 170) of the destination is no longer suitable for routing data packets to the destination and a different GRIDS-AP should now be used.

In response to the mapping update, the GRIDS-MS 150 sends a check-authorization request communication 430 to the GRIDS-PS 160, to determine if the mapping update should be forwarded to the originator or if the policy has changed and access should now be denied. The GRIDS-PS 160 performs the policy check (operation 440), this time finding that the changed policy results in a denial, and sends an authorization-response communication 450 that indicates the denial.

In response to receiving the authorization-response indicating the denial, the GRIDS-MS 150 drops the originator's subscription to the destination's location, so that the originator will no longer receive updates when the destination's location changes. The GRIDS-MS 150 also sends an update message (communication 460) to the originator indicating a null locator or a location of a security endpoint 130. Had the authorization-response indicated that communication was still permitted, the GRIDS-MS 150 would have sent the updated locator for the destination.

After receiving a locator, the originator begins sending traffic to the locator, thus resuming communication with the destination or beginning communication with the security endpoint 130. If a null locator is received, the originator ceases the communication. The security endpoint 130 may receive traffic from the originator endpoint 110 that indicates an identifier of the destination endpoint 120. The security endpoint 130 may analyze the received traffic to determine if the originator endpoint 110 is malicious (e.g., distributing unwanted e-mails, mounting a denial of service attack, attempting a phishing campaign, or any suitable combination thereof) and communicate with the GRIDS-PS 160 to change global policies.

In some example embodiments, use of the disclosed policy service provides one or more of the following advantages: places defense perimeter at the sender, far away from the receiver; reduces waste of network resources; reduces or eliminates wasted resources at the destination; allows blocking traffic regardless of the specific identifier used by an entity (same policy applies to all identifiers of an identity)—attackers cannot simply choose a different identifier to circumvent blocking; allows entities to decide what traffic they would like to receive based on sender identity (and other properties tied to identity, such as metadata) can be a major differentiator for ION; the fact that an entity is prohibited from sending traffic to a given entity does not need to be directly revealed to that entity.

Figure 5:
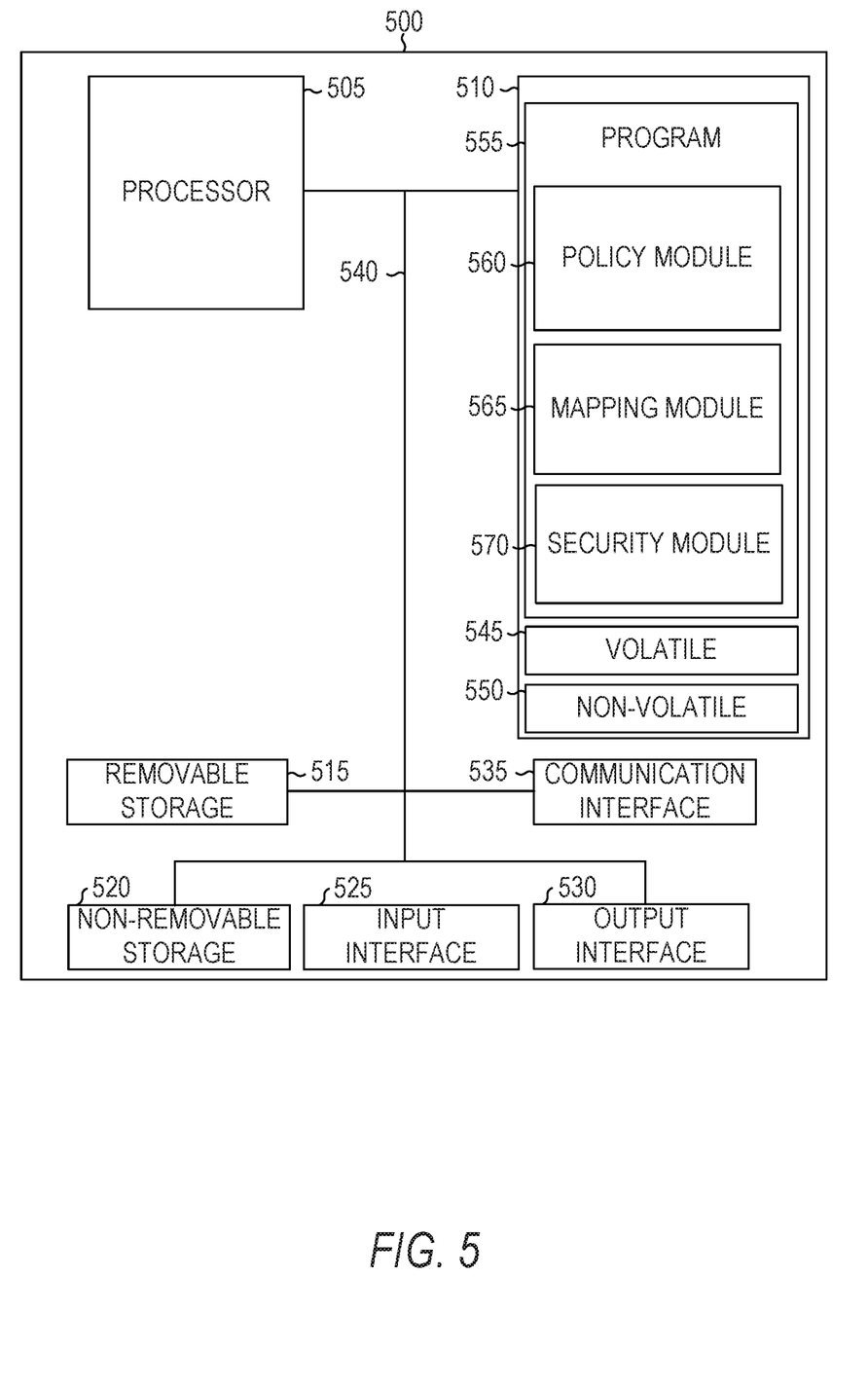
FIG. 5 is a block diagram illustrating circuitry for clients and servers that implement algorithms and perform methods, according to some example embodiments.

FIG. 5 is a block diagram illustrating circuitry for implementing algorithms and performing methods, according to example embodiments. All components need not be used in various embodiments. For example, the clients, servers, and cloud-based network resources may each use a different set of components, or in the case of servers for example, larger storage devices.

One example computing device in the form of a computer 500 (also referred to as computing device 500 and computer system 500) may include a processor 505, memory storage 510, removable storage 515, non-removable storage 520, input interface 525, output interface 530, and communication interface 535, all connected by a bus 540. Although the example computing device is illustrated and described as the computer 500, the computing device may be in different forms in different embodiments.

The memory storage 510 may include volatile memory 545 and non-volatile memory 550, and may store a program 555. The computer 500 may include—or have access to a computing environment that includes—a variety of computer-readable media, such as the volatile memory 545, the non-volatile memory 550, the removable storage 515, and the non-removable storage 520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 555 stored in the memory 510) are executable by the processor 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 555 may provide a policy service using modules such as a policy module 560, a mapping module 565, and a security module 570. Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The policy module 560 may create policies, transmit policies, receive policies, store policies, retrieve policies, evaluate policies, or any suitable combination thereof. For example, a policy module 560 of a destination endpoint 120 may provide a user interface to a user of the destination endpoint 120, receive user input from the user that indicates one or more entities not permitted to communicate with the destination endpoint 120 and transmit the policies to the GRIDS-PS 160. As another example, a policy module 560 of the GRIDS-PS 160 may receive policies from endpoints or administrators and store those policies in a database. The policy module 560 of the GRIDS-PS 160 may also retrieve stored policies from a database and evaluate the retrieved policies in providing an authorization response in response to a check authorization request from the GRIDS-MS 150.

The mapping module 565 handles mappings between locators and identities. The mapping module 565 may create mappings, transmit mappings, receiving mappings, store mappings, retrieve mappings, or any suitable combination thereof. For example, a mapping module 565 of a destination endpoint 120 may provide a user interface to a user of the destination endpoint 120, receive user input from the user that indicates an identity of the destination endpoint 120 and transmit the identity to the GRIDS-MS 150. The locator of the destination endpoint 120 may be sent explicitly (e.g., in a data portion of a data packet) or implicitly (e.g., in a header portion of a data packet) to complete the mapping data. As another example, a mapping module 565 of the GRIDS-MS 150 may receive mappings from endpoints or administrators and store those mappings in a database. The mapping module 565 of the GRIDS-MS 150 may also retrieve stored mappings from a database for use in providing a resolve response in response to a resolve location request (e.g., from the endpoint 110).

The security module 570 (e.g., of the security endpoint 130) may receive data packets from originators that have been denied access to the locator of an endpoint. The security module 570 may be implemented in a security server separate from the GRIDS-MS 150 and the GRIDS-PS 160. The security module 570 may analyze the received data packets to determine if the traffic is harmful.

Figure 6:
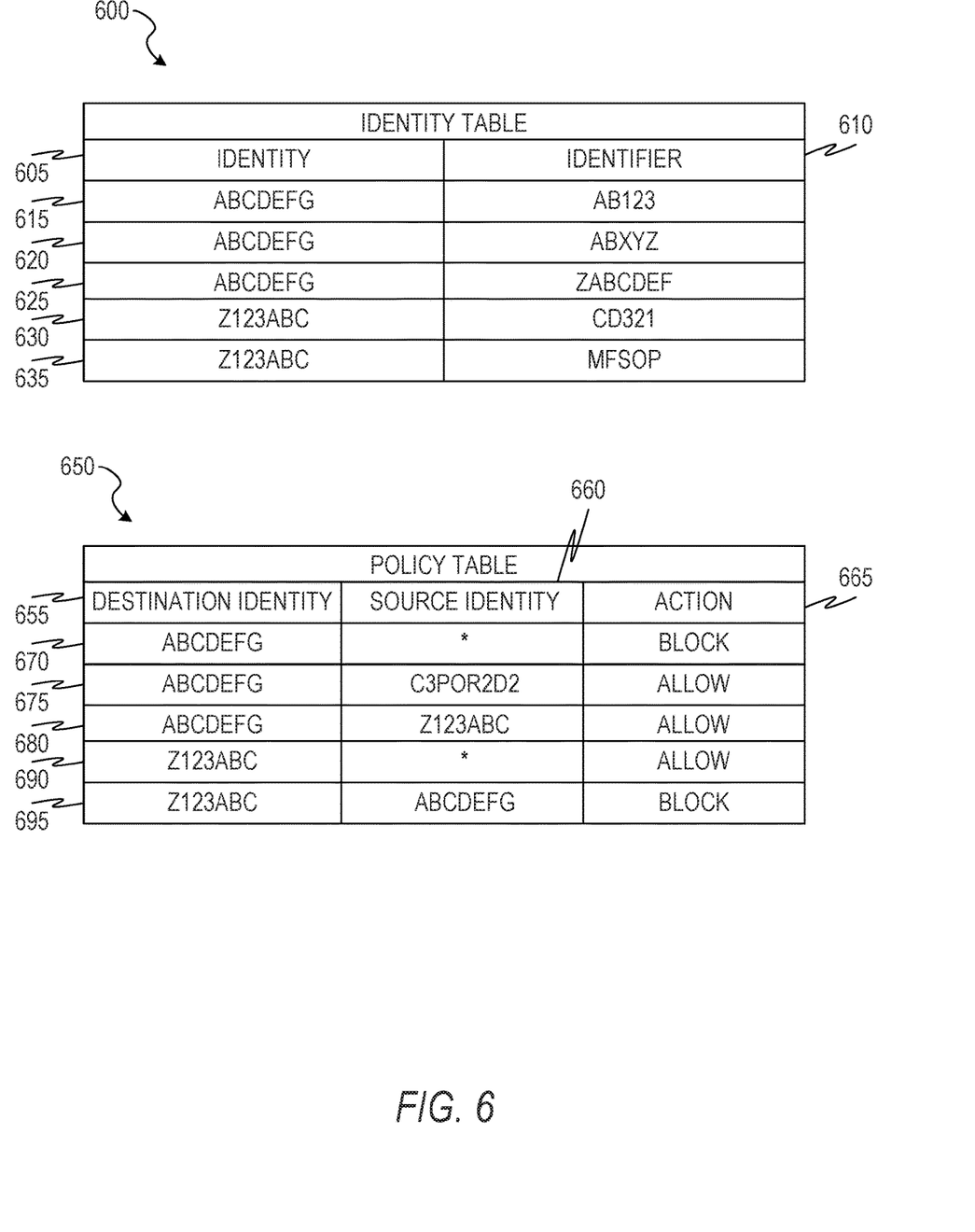
FIG. 6 is a block diagram illustration of a database schema for implementing an originator-based network restraint system for IONs, according to some example embodiments.

FIG. 6 is a block diagram illustration of a database schema for implementing an originator-based network restraint system for IONs, according to some example embodiments. The data base schema of FIG. 6 includes an identity table 600 and a policy table 650. The identity table 600 includes an identity field 605 and an identifier field 610. Rows 615, 620, 625, 630, and 635 of the identity table 600 are shown. The policy table 650 includes a destination identity field 655, a source identity field 660, and an action field 665. Rows 670, 675, 680, 690, and 695 of the policy table 650 are shown.

The identity table 600 maps one or more identifiers to the unique identity for each endpoint. Thus, the rows 615, 620, and 625 show that the identity "ABCDEFG" corresponds to the identifiers "AB123," "ABXYZ," and "ZABCDEF." Accordingly, the endpoint having the identity "ABCDEFG" may use any of the identifiers "AB123," "ABXYZ," or "ZABCDEF" when registering with the GRIDS network 140 and the endpoint will still be recognized as having the identity "ABCDEFG." As a result, a request by the endpoint to the GRIDS-MS 150 for a locator for another endpoint can be handled by the GRIDS-MS 150 and the GRIDS-PS 160 with reference to the identity of the endpoint instead of the identifier of the endpoint.

The policy table 650 stores one or more policies for one or more endpoints. The destination identity field 655 contains the identity of the endpoint for which the policy applies. The source identity field 660 contains the identity of the endpoint affected by the policies, an asterisk indicates that the policy affects all endpoints requesting to communicate with the destination unless a more narrow policy contradicts the general policy. The action field 665 contains the action of the policy. Thus, the policy of row 670 blocks communication of all endpoints with the destination "ABCDEFG." The policies of rows 675 and 680 identify two endpoints allowed to communicate with the destination "ABCDEFG" despite the blanket ban. The policy of row 690 allows all endpoints to communicate with the destination "Z123ABC," but the policy of row 695 overrides the general permission with the specific block of the source "ABCDEFG."

Figure 7:
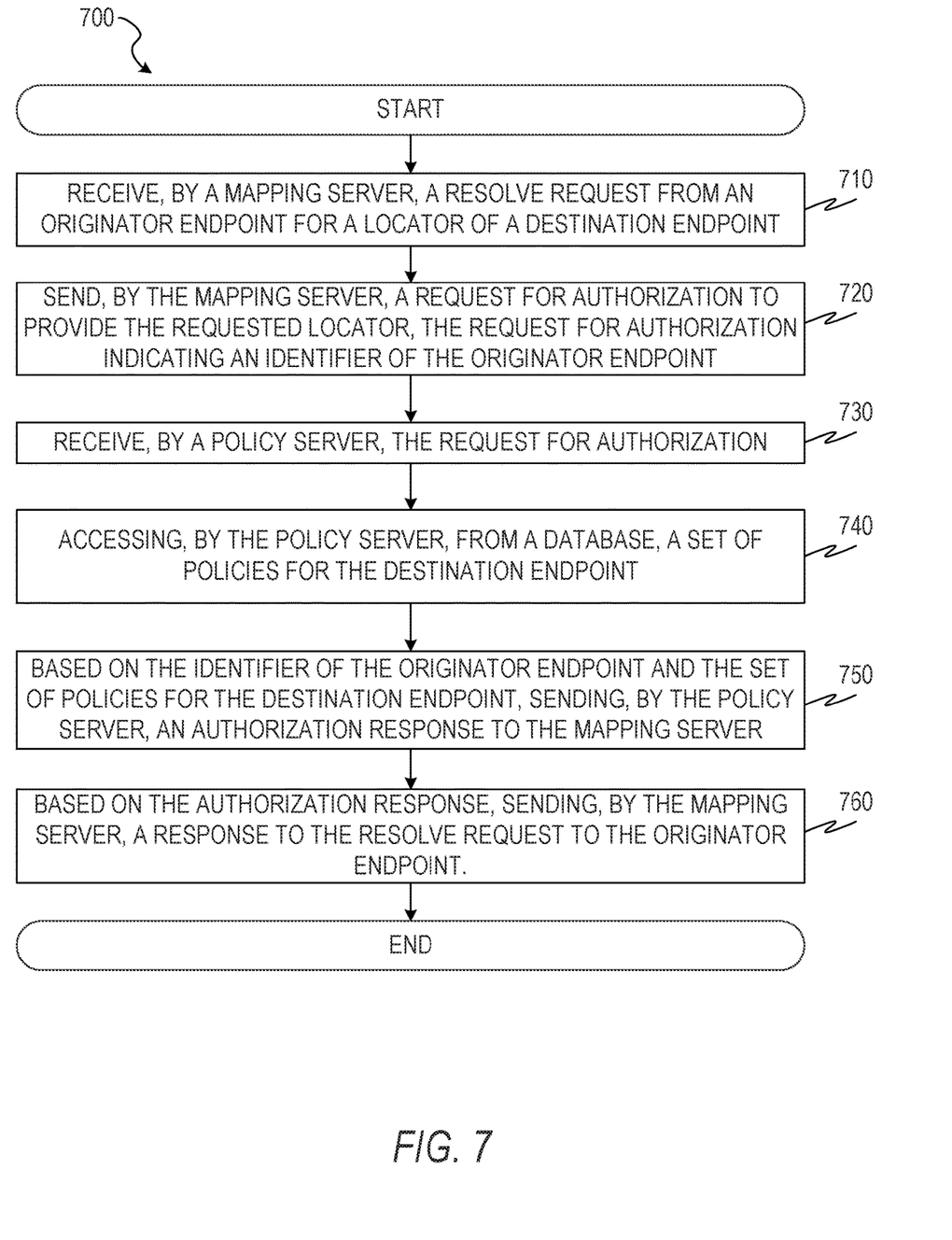
FIG. 7 is a flowchart illustration of a method of implementing an originator-based network restraint system for IONs, according to some example embodiments.

FIG. 7 is a flowchart illustration of a method 700 of implementing an originator-based network restraint system for IONs, according to some example embodiments. The method 700 includes operations 710, 720, 730, 740, 750, and 760. By way of example and not of limitation, the method 700 is described as being performed by the GRIDS-MS and GRIDS-PS of FIGS. 1-4 and the modules of the computer 500 of FIG. 5.

In operation 710, the mapping module 565 of the GRIDS-MS 150 receives a resolve request from an originator endpoint for a locator of a destination endpoint. For example, the resolve request may be received from the originating endpoint 110, requesting a locator of the destination endpoint 120.

In operation 720, the mapping module 565 of the GRIDS-MS 150 sends a request for authorization to provide the requested locator. The request for authorization indicates an identifier or the originator endpoint. For example, the request for authorization may be sent to the GRIDS-PS 160 and indicate an identifier of the originating endpoint 110.

In operation 730, the policy module 560 of the GRIDS-PS 160 receives the request for authorization. In operation 740, the policy module 560 of the GRIDS-PS 160 accesses, from a database, a set of policies for the destination endpoint. For example, policies from the policy table 650 may be accessed.

In operation 750, the policy module 560 of the GRIDS-PS 160 sends an authorization response to the GRIDS-MS 150 based on the identifier of the originating endpoint 110 and the set of policies for the destination endpoint 120. The authorization response may indicate that authorization is granted or denied for the originating endpoint 110 to receive the locator of the destination endpoint 120.

In operation 760, the mapping module 565 of the GRIDS-MS 150 sends, based on the authorization response, a response to the resolve request to the originating endpoint 110. For example, if the authorization response indicates the originating endpoint 110 is permitted to receive the locator of the destination endpoint 120, the response to the resolve request sent by the GRIDS-MS 150 may include the requested locator. As another example, if the authorization response indicates that authorization is denied for the originating endpoint 110 to receive the locator of the destination endpoint 120, the response to the resolve request sent by the GRIDS-MS 150 may exclude the requested locator. A response to the resolve request sent to the originating endpoint 110 that excludes the locator of the destination endpoint 120 may include a null locator, a locator of a security system, an indicator that no locator is being provided, or any suitable combination thereof.

Figure 8:
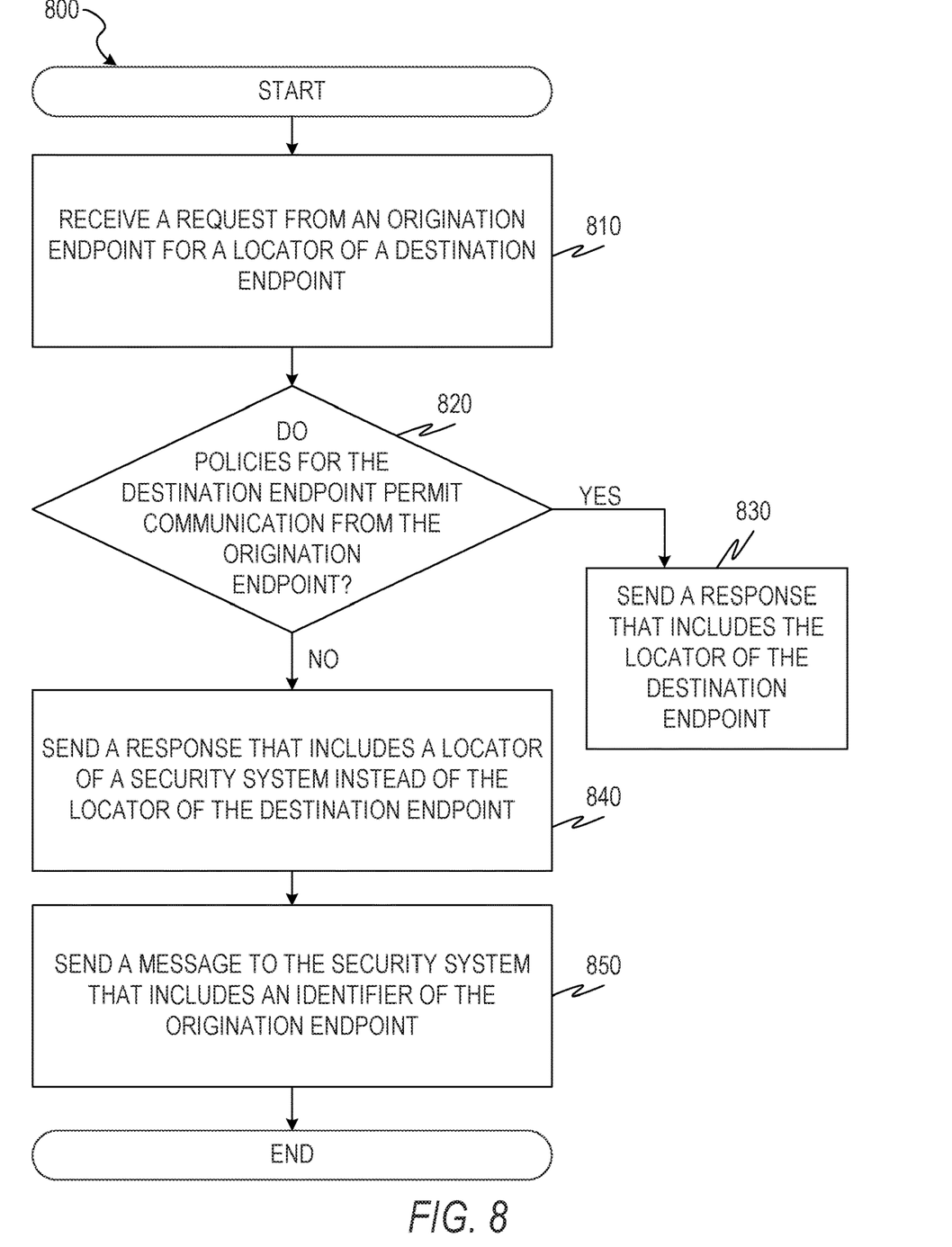
FIG. 8 is a flowchart illustration of a method of implementing an originator-based network restraint system for IONs, according to some example embodiments.

FIG. 8 is a flowchart illustration of a method 800 of implementing an originator-based network restraint system for IONs, according to some example embodiments. The method 800 includes operations 810, 820, 830, 840, and 850. By way of example and not of limitation, the method 800 is described as being performed by the systems of FIGS. 1-4 and the modules of the computer 500 of FIG. 5.

In operation 810, the mapping module 565 (e.g., of the GRIDS-MS 150) receives a request from an origination endpoint (e.g., the endpoint 110) for a locator of a destination endpoint (e.g., the endpoint 120). The request for the locator may also include a subscription request that indicates that the origination endpoint should be informed if the locator of the destination endpoint later changes. In this way, the destination endpoint will be informed by the GRIDS-MS 150 when the destination endpoint changes location, allowing a communication flow to continue without interruption even when the destination endpoint changes locations in the data plane 180 (e.g., when a cell phone changes between cell towers used to connect to the network).

In operation 820, the policy module 560 (e.g., of the GRIDS-PS 160) determines if policies for the destination endpoint permit communication to the destination endpoint from the origination endpoint. If the policies do permit communication, the mapping module 565 sends a response that includes the locator of the destination endpoint (operation 830). Otherwise, the mapping module 565 sends a response that includes a locator of a security system instead of the locator of the destination endpoint (operation 840).

In some example embodiments, the mapping module 565 also performs operation 850, sending a message to the security system (e.g., the security system 130) that includes an identifier of the origination endpoint (e.g., the endpoint 110). If the security system 130 receives communications from the origination endpoint within a predetermined time period of receipt of the message, a determination is made that the request for the locator of the destination endpoint was for active communication. However, if the security system 130 does not receive communications from the origination endpoint within the predetermined period of time, a determination is made that the request for the locator of the destination was as a probe. Depending on the identification of the attempted communication with the destination as either active or probing, different security measures may be taken.

Figure 9:
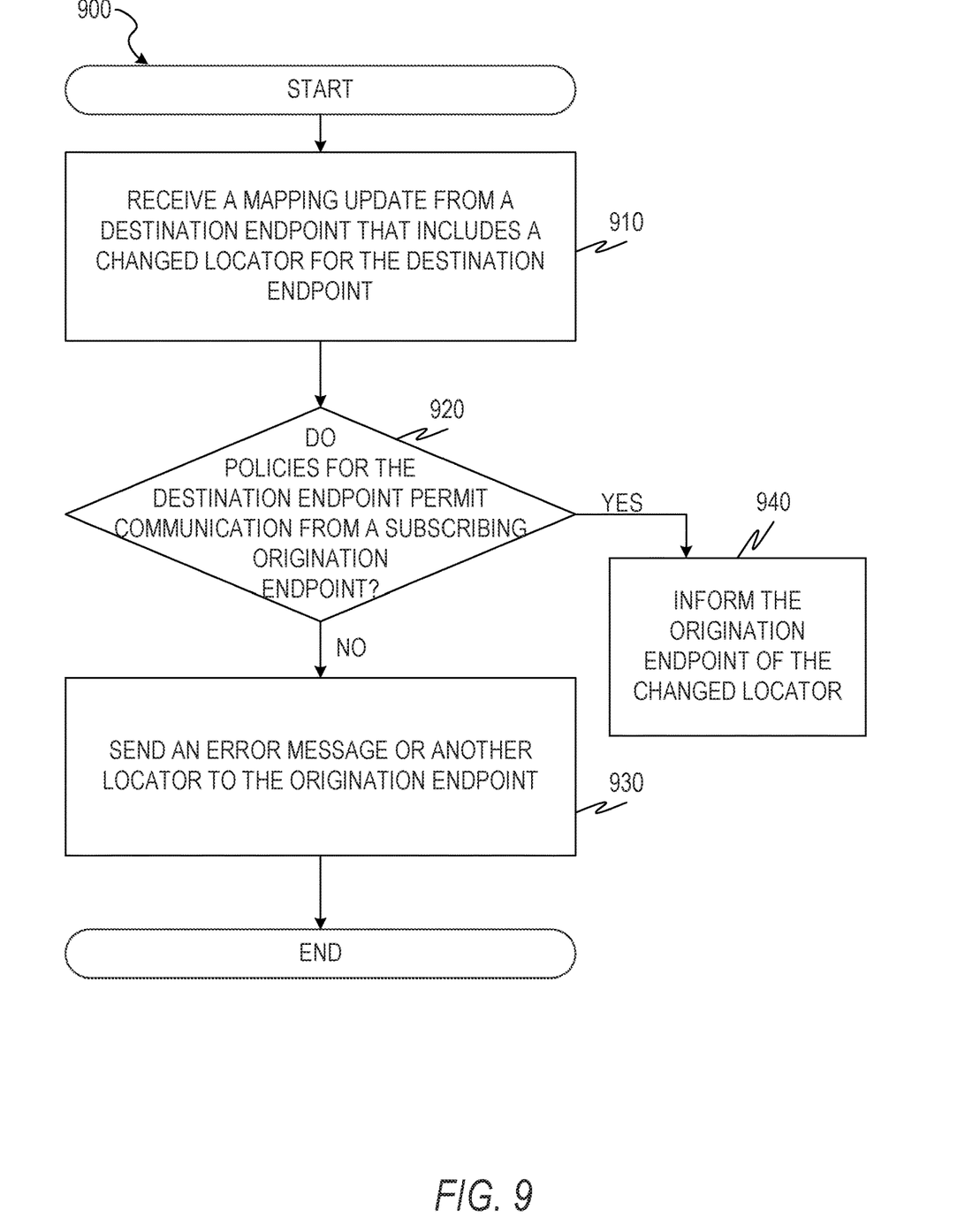
FIG. 9 is a flowchart illustration of a method of implementing an originator-based network restraint system for IONs, according to some example embodiments.

FIG. 9 is a flowchart illustration of a method 900 of implementing an originator-based network restraint system for IONs, according to some example embodiments. The method 900 includes operations 910, 920, 930, and 940. By way of example and not of limitation, the method 900 is described as being performed by the systems of FIGS. 1-4 and the modules of the computer 500 of FIG. 5.

In operation 910, the mapping module 565 (e.g., of the GRIDS-MS 150) receives a mapping update from a destination endpoint (e.g., the destination endpoint 120) that includes a changed locator for the destination endpoint. For example, the destination endpoint 120 may have been connected via a first wireless access point and have physically moved to be connected via a second wireless access point instead. In order for traffic addressed to the identity of the destination endpoint to reach the destination endpoint, the destination endpoint sends the updated locator to the GRIDS-MS 150, so that the GRIDS-MS 150 can properly respond to mapping requests.

In operation 920, the policy module 560 determines if policies for the destination endpoint permit communication from a subscribing origination endpoint. For example, the request received in operation 810 of FIG. 8 may have included a subscription request. With a subscription request, an origination endpoint requests to receive an updated locator for the destination endpoint whenever the destination endpoint changes locators. In this way, the origination endpoint can update the locator of future data packets and continue communicating with the destination endpoint even when the destination endpoint changes locations. However, instead of immediately sending the updated locator to the subscribing origination endpoint, the GRIDS-MS 150 may request a confirmation from the GRIDS-PS 160 that the origination endpoint is still permitted to the communicate with the destination endpoint.

If communication is still permitted, the mapping module 565, in operation 940, informs the origination endpoint of the changed locator. If communication is no longer permitted, the mapping module 565 sends an error message or other locator (e.g., a null locator or a locator of a security system) to the origination endpoint (operation 930).

Devices and methods disclosed herein may reduce time, processor cycles, and power consumed in providing a restraint system for IONs. For example, devices and methods disclosed herein may block communication from an undesired source by preventing the source from sending data packets on the network at all instead of discarding the unwanted data packets after they have been received by the destination, allowing for reduction of network usage and congestion. By reducing the number of packets sent, processor cycles and power consumption on both the destination endpoint and intermediate routing devices are saved.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of extending generic resilient identity services (GRIDS) comprising:
   receiving, by one or more processors of a mapping server, a resolve request from an originator endpoint for a locator of a destination endpoint, the mapping server, the originator endpoint, and the destination endpoint being separate devices;
   sending, by the one or more processors of the mapping server to a policy server, a request for authorization to provide the locator of the destination endpoint, the request for authorization indicating an identifier of the originator endpoint, the policy server being a separate device from the mapping server, the originator endpoint, and the destination endpoint;
   receiving, by one or more processors of the policy server, the request for authorization;
   accessing, by the one or more processors of the policy server, from a database, a set of policies for the destination endpoint;
   based on the identifier of the originator endpoint and the set of policies for the destination endpoint, sending, by the one or more processors of the policy server, an authorization response to the mapping server; and
   based on the authorization response, sending, by the one or more processors of the mapping server, a response to the resolve request to the originator endpoint.

2. The computer-implemented method of claim 1, wherein the authorization response sent by the policy server denies authorization and the response to the resolve request sent by the mapping server excludes the locator of the destination endpoint.

3. The computer-implemented method of claim 2, wherein the response to the resolve request includes an indication that the response to the resolve request excludes the locator of the destination endpoint.

4. The computer-implemented method of claim 2, wherein the response to the resolve request that excludes the locator of the destination endpoint includes a locator of a security system in place of the locator of the destination endpoint.

5. The computer-implemented method of claim 4, further comprising:
receiving, at the security system, data packets from the originator endpoint, the data packets indicating the locator of the security system and an identifier of the destination endpoint.

6. The computer-implemented method of claim 1, wherein the response to the resolve request includes the locator of the destination endpoint.

7. The computer-implemented method of claim 1, wherein each policy of the set of policies indicates a set of criteria for preventing entities from receiving a locator for the destination endpoint.

8. A system comprising:
a policy server;
a mapping server separate from the policy server, the mapping server comprising:
   a first memory storage comprising first instructions; and
   one or more first processors in communication with the first memory storage, wherein the one or more first processors execute the first instructions to perform:
      receiving a resolve request from an originator endpoint for a locator of a destination endpoint, the originator endpoint and the destination endpoint being separate devices from each other, the mapping server, and the policy server; and
      sending, to the policy server, a request for authorization to provide the locator of the destination endpoint, the request for authorization indicating an identifier of the originator endpoint;
wherein the policy server comprises:
   a second memory storage comprising second instructions; and
   one or more second processors in communication with the second memory storage, wherein the one or more second processors execute the second instructions to perform:
      receiving the request for authorization;
      accessing from a database, a set of policies for the destination endpoint; and
      based on the identifier of the originator endpoint and the set of policies for the destination endpoint, sending an authorization response to the mapping server; and
the one or more first processors of the mapping server are further configured to perform:
   based on the authorization response, sending a response to the resolve request to the originator endpoint.

9. The system of claim 8, wherein the authorization response denies authorization and the response to the resolve request excludes the locator of the destination endpoint.

10. The system of claim 9, wherein the response to the resolve request includes a null locator in place of the locator of the destination endpoint.

11. The system of claim 9, wherein the response to the resolve request includes an indication that the response to the resolve request excludes the locator of the destination endpoint.

12. The system of claim 9, wherein the response to the resolve request includes a locator of a security system in place of the locator of the destination endpoint.

13. The system of claim 12, further comprising:
the security system, comprising:
   a third memory storage comprising third instructions; and
   one or more third processors in communication with the third memory storage, wherein the one or more third processors execute the third instructions to perform:
      receiving data packets from the originator endpoint, the data packets indicating the locator of the security system and an identifier of the destination endpoint.

14. The system of claim 9, wherein:
the resolve request for the locator of the destination endpoint is a second resolve request for a second locator of the destination endpoint;
the request for authorization to provide the second locator is a second request for authorization;
the authorization response is a second authorization response;
the response to the resolve request is a second response to the second resolve request;
the one or more first processors of the mapping server are further configured to perform:
   receiving, prior to the receipt of the second resolve request, a first resolve request from the originator endpoint for a first locator of the destination endpoint; and
   sending a first request for authorization to provide the first locator, the first request for authorization indicating the identifier of the originator endpoint;
the one or more second processors of the policy server are further configured to perform:
   receiving the first request for authorization; and
   based on the identifier of the originator endpoint and the set of policies for the destination endpoint, sending a first authorization response that grants authorization;
the one or more first processors of the mapping server are further configured to perform:
   based on the first authorization response, sending a first response to the first resolve request to the originator endpoint, the first response to the first resolve request including the first locator of the destination endpoint; and
the one or more second processors of the policy server are further configured to perform:
   receiving a policy for the destination endpoint; and
   updating the set of policies for the destination endpoint based on the received policy.

15. The system of claim 8, wherein the response to the resolve request includes the locator of the destination endpoint.

16. A non-transitory computer-readable medium storing computer instructions wherein, the instructions, when executed by one or more processors of a mapping server and a policy server, cause the one or more processors to perform steps of:
receiving, by the mapping server, a resolve request from an originator endpoint for a locator of a destination endpoint, the mapping server, the originator endpoint, and the destination endpoint being separate devices;

sending, by the mapping server to the policy server, a request for authorization to provide the locator of the destination endpoint, the request for authorization indicating an identifier of the originator endpoint, the policy server being a separate device from the mapping server, the originator endpoint, and the destination endpoint;

receiving, by the policy server, the request for authorization;

accessing, by the policy server, from a database, a set of policies for the destination endpoint;

based on the identifier of the originator endpoint and the set of policies for the destination endpoint, sending, by the policy server, an authorization response to the mapping server; and based on the authorization response, sending, by the mapping server, a response to the resolve request to the originator endpoint.

17. The non-transitory computer-readable medium of claim 16, wherein the authorization response sent by the policy server denies authorization and the response to the resolve request sent by the mapping server excludes the locator of the destination endpoint.

18. The non-transitory computer-readable medium of claim 17, wherein the response to the resolve request includes a null locator in place of the locator of the destination endpoint.

19. The method of claim 1, further comprises:

receiving, by the mapping server, an updated locator of the destination endpoint; and based on the request for the locator of the destination endpoint comprising a subscription request, sending, by the mapping server to the originator endpoint, the updated locator.

20. The method of claim 4, further comprising:

sending, from the mapping server to the security system, a message that comprises a locator of the originator endpoint;

after an elapse of a predetermined period of time without receiving any messages from the originator endpoint at the security system, determining that the resolve request was a probe; and based on the determination that the resolve request was a probe, taking a security measure.

* * * * *